July 25, 1967     E. C. COLEN ET AL     3,333,279
METHOD OF MAKING FREQUENCY RESPONSIVE DEVICE
Filed April 29, 1964     3 Sheets-Sheet 1
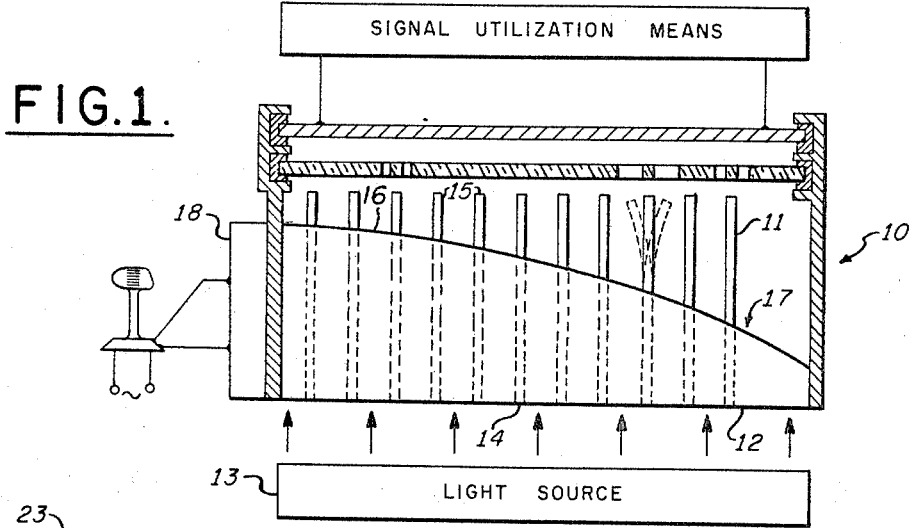
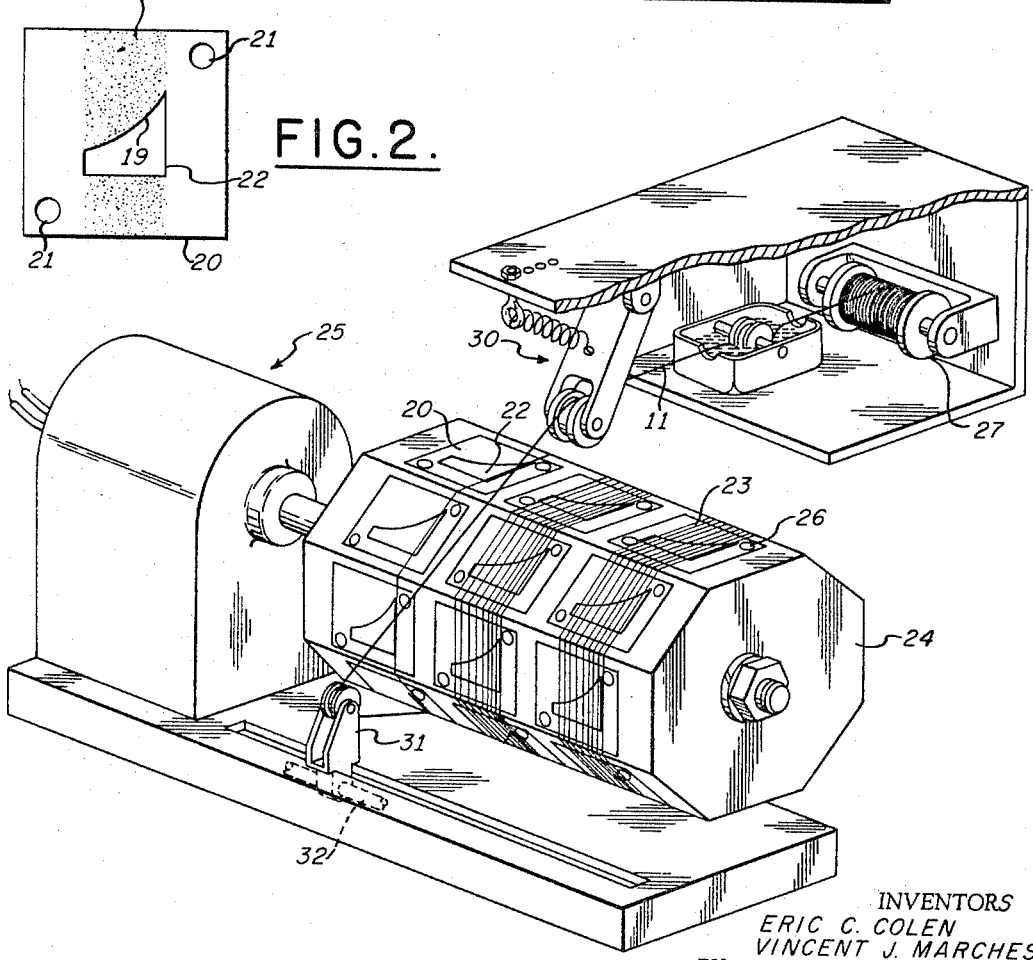
INVENTORS
ERIC C. COLEN
VINCENT J. MARCHESE
BY H P Terry
ATTORNEY July 25, 1967  E. C. COLEN ET AL  3,333,279
METHOD OF MAKING FREQUENCY RESPONSIVE DEVICE
Filed April 29, 1964  3 Sheets-Sheet 2

INVENTORS
ERIC C. COLEN
VINCENT J. MARCHESE
BY
ATTORNEY

July 25, 1967  E. C. COLEN ET AL  3,333,279

METHOD OF MAKING FREQUENCY RESPONSIVE DEVICE

Filed April 29, 1964  3 Sheets-Sheet 3

INVENTORS
ERIC C. COLEN
VINCENT J. MARCHESE

BY

ATTORNEY

United States Patent Office 3,333,279
Patented July 25, 1967

3,333,279
METHOD OF MAKING FREQUENCY RESPONSIVE DEVICE
Eric C. Colen, Levittown, and Vincent J. Marchese, Huntington, N.Y., assignors to Sperry Rand Corporation, Great Neck, N.Y., a corporation of Delaware
Filed Apr. 29, 1964, Ser. No. 363,470
7 Claims. (Cl. 156—155)

ABSTRACT OF THE DISCLOSURE

A method of making a fiber array utilizing coil winding, stacking and bonding techniques to form a plurality of flexible fibers into an integral unit responsive to a plurality of frequencies.

---

This invention relates to the method of making an array consisting of a plurality of energy transmitting elements in which the elements have varying resonant frequencies with respect to each other. The method of the present invention is particularly suitable for producing energy transmitting devices of the fiber optic type, for example, generally of the type shown in U.S. patent application S.N. 185,064 entitled, "Frequency Responsive Apparatus," filed Apr. 4, 1962, and U.S. patent application S.N. 284,712 entitled, "Frequency Responsive Apparatus," filed May 31, 1963, both in the name of Robert D. Hawkins.

A typical energy transmitting device as produced by the present invention has a large number of tiny light-conductive fibers secured in a mounting member that is preferably opaque. Each of the fibers has substantially the same light transmission and structural characteristics as well as the same cross-sectional area, the latter being substantially circular. The fibers are secured in the opaque member in cantilevered fashion with varying free lengths which are free to vibrate at varying resonant frequencies.

The present invention is an improvement over the method disclosed in U.S. patent application S.N. 285,551 entitled, "Method of Making Frequency Responsive Devices," filed May 31, 1963, in the name of Robert D. Hawkins et al, in that the present invention produces arrays having more accurately defined predetermined characteristics and produces arrays more economically than the previous method. The present invention provides an array having a very accurately contoured interface from which the fibers extend thereby providing precise control of the frequency range to which the array is responsive.

It is an object of the present invention to provide a method of producing an energy transmitting device which is responsive to a plurality of frequencies.

It is another object of the present invention to provide a method of producing an energy transmitting device having a plurality of cantilevered elements which resonate at a plurality of frequencies over a desired frequency range.

It is a further object of the present invention to provide a method of producing an energy transmitting device having an array which is responsive to a plurality of frequencies whose characteristics can be accurately controlled and is economical to manufacture.

These and other objects of the present invention are accomplished by the method of producing a frequency responsive device having a desired plurality of flexible energy transmitting elements which includes the steps of forming a mounting member, securing a first plurality of said elements to said mounting member in aligned and spaced relation whereby in the finished device at least one end of each of said elements is free to vibrate, stacking a plurality of said mounting members to provide said desired plurality of elements in said aligned and spaced relation, and forming a stacked mounting member into an integral unit to provide an array of said elements disposed for vibration in response to a plurality of frequencies over a desired frequency range.

Referring to the drawings:

FIG. 1 is a side view partly in section of a typical frequency responsive energy transmitting device having an array produced in accordance with the present invention;

FIG. 2 is a top view of a mounting member or frame showing the index holes and contoured aperture;

FIG. 3 is a perspective view showing the frames of FIG. 2 mounted on a winding machine and being wound;

Figure 4:
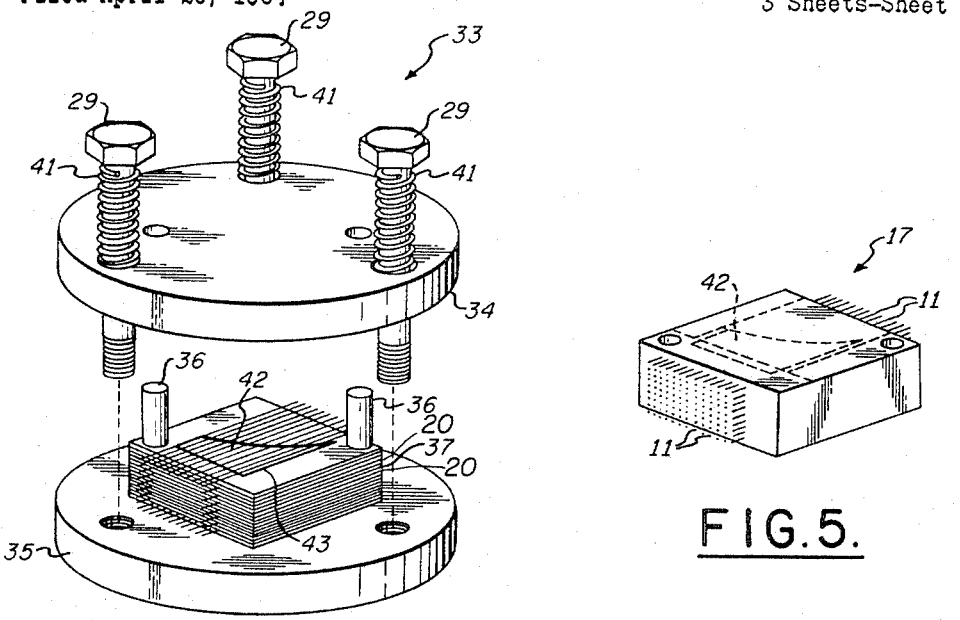
FIG. 4 is an exploded perspective view showing the frames being stacked in a stacking fixture.

The present invention will be described with respect to a method of producing a frequency responsive array of energy transmitting fibers in which the fibers have a substantially circular cross-section of small diameter and consist of flexible quartz which transmits light. It will be appreciated that the present invention is entirely suitable for making a frequency responsive array of elements which transmit energy in other ways and involving elements shaped other than circular and of a material other than quartz, as will become apparent from the following description.

To produce a frequency responsive device 10 of the character shown in FIG 1, a plurality of light conducting flexible quartz fibers 11 are utilized. The device 10 and the fibers 11 may be of the type disclosed in said U.S. patent application S.N. 185,064. Preferably, the fibers 11 are clear fused quartz of optical quality, for example, Spectrosil®, which may be obtained in the form of a continuous spool from The Thermal American Fused Quartz Company of Montville, N.J. The application of the frequency responsive device 10 determines the diameter of the fibers 11 which for purposes of example will be considered as .003″ in diameter.

In the finished product, the fibers 11 are mounted in a support member 12 in order that the fibers 11 extend beyond the member 12 in cantilevered fashion with the exposed portions free to vibrate. In the embodiment shown in FIG. 1, the fibers 11 extend through the member 12 in order that light as indicated by the light source 13 is conducted from the supported end 14 of each of the fibers 11 nearest the light source 13 to emanate from the other free end 15 of the fibers 11. The fibers 11 have varying free lengths which extend from an accurately contoured interface 16 beyond the support member 12 in order that when the support member is vibrated by a vibrator 18, the fibers respond in accordance with their respective varying resonant frequencies to vibrate as indicated by the dotted lines in the manner taught in said U.S. patent application S.N. 185,064. The support member 12 is composed of opaque material or made opaque in order that the light 13 is transmitted in the absence of vibration, through the parallel paths defined by the fibers 11 which have their respective longitudinal axes parallel with respect to each other in order to provide an output signal when operated in accordance with the teachings of said U.S. patent application S.N. 185,064. The refractive index of the fibers 11 is such that useful light emanates from the free ends 15.

The fibers 11 supported in the support member 12, as explained, define an array 17 responsive to a plurality of frequencies throughout a desired frequency range.

In accordance with the present invention, the array 17 is constructed of a plurality of laminations formed into an integral unit. Each of the laminations is in the form of a planar mounting member or frame 20 as shown in FIG. 2. The frame 20 may be made of any thin film supportive material organic as well as inorganic or metallic which has the proper physical and mechanical properties as required in the end product. The invention will be described with respect to a frame 20 made of an epoxy fiberglass laminate such as Phenolite® sheet approximately .0078" thick obtainable from the National Vulcanized Fiber Corporation, Wilmington, Del. as their G11–861 preferably dyed black. The method of manufacturing the frame 20 is dependent upon the material used while the type of material is dependent upon the environmental conditions to which the device 10 will be subjected and in the desired structural Q value of the fibers 11. Each frame 20 has index holes 21 and an aperture 22 having a predetermined shape formed therein by punching or other methods. As shown in FIG. 2, each aperture 22 is formed of three straight sides closed by a fourth side having a predetermined contour 19 related to the desired frequency responsive range. In the finished array 17, the contours 19 of the apertures 22 cooperate to form the interface 16 which in combination with the fiber length, fiber diameter and type of fiber material defines the desired frequency response of the array 17 in a manner to be more fully explained. It will become obvious that the apertures 22 may be of other shapes and have contours other than that shown in FIG. 2.

Each frame 20 is coated with an adhesive 23 on one side over the area, as shown in FIG. 2, in which the fibers 11 will be embedded in a subsequent step. The adhesive must be compatible with the remaining manufacturing steps and meet the environmental conditions to which the device 10 will be subjected. Liquid epoxy resins such as the reaction product of bisphenol A and epichlorohydrin having an epoxide equivalent between 180–195 such as Epon 828 of the Shell Chemical Company hardened with triethylenetetramine have been found to be suitable adhesive. The adhesive coating 23 is sprayed or otherwise applied to the desired area. The adhesive coating 23 is tacky thereby permitting firm imbedment of the fibers 11 in the subsequent steps.

As shown in FIG. 3, the coated frames 20 are mounted by their index holes 21 on the octagonal winding drum 24 attached to any conventional winding machine 25. The frames 20 are mounted on the drum 24 with their respective apertures 22 aligned with respect to each other. The winding drum 24 may have a cross-section that is either circular or a polygon depending primarily upon the material forming the frame 20. Primarily, the drum 24 must be of sufficient diameter to avoid fiber breakage and to permit a good lay of fiber 11 on the frame 20. The drum 24 has locating pins 26 protruding therefrom the thickness of the frame 20. The pins 26 are disposed on a lead angle corresponding to the spacing of the fibers 11 in order that the frame 20 is arranged in such fashion that the fibers 11 always line up with each other when the frames 20 are stacked in the steps to follow.

The fiber 11 flows from a supply spool 27 across a tension adjustment device 30 and is guided by a movable guide 31 driven across a transverse bar 32 in accordance with conventional winding techniques. With a quartz fiber 11 having a .003" diameter, a .010" spacing between centers of the fibers 11 has been found satisfactory. The fibers 11 are passed through a solvent cleaning bath prior to being wound on the frames 20 to remove any foreign contaminants. The fibers 11 are wound on the frames 20 across the respective apertures 22 in spaced, parallel relation and abutting the adhesive coating 23. After the wind is completed, the fiber 11 from the spool 27 is cut, the drum 24 with the wound frames 20 thereon is removed from the winding machine 24, and the drum 24 is oven baked to have the epoxy resin adhesive 23 cured to firmly imbed the fibers 11 on the frames 20. This is done by placing the drum 24 in an oven at 100° F. for about 90 minutes. The wound frames 20 are then removed from the drum 24 by cutting the quartz fibers 11 between the frames 20 and lifting the wound frames 20 from the drum 24. The wound frames 20 are now ready to be stacked.

As shown in FIG. 4, the wound frames 20 are stacked in a stacking fixture 33 with a suitable binder between the wound frames 20 which form the laminations. The stacking fixture 33 consists of a top plate 34, a bottom plate 35, index pins 36 and spring loaded compression adjusting screws 29. The indexing pins 36 use the same frame locating holes 21 as used in locating the frames 20 on the drum 24. After placing two blank Phenolite frames 20 on the bottom plate 35 and aligning them by means of the indexing pins 36, wound frames 20 are stacked on the fixture 33 with the fibers 11 facing up and with all the apertures 22 aligned by means of the indexing pins 36. Between each frame 20, there is located an adhesive preferably formed of a B stage (partial cure) epoxy sheet 37. Each B stage sheet 37 is substantially identical in shape to the frame 20 including index holes and an aperture (not shown). The thickness of the B stage sheet 37 is dependent upon the spacing and size of the fibers 11. The B stage sheet 37 is preferably an epoxy resin that is non-tacky, will soften under curing heat, and act as the bonding agent to fuse the individual frames 20 into an integral array 17. A B stage reinforced fiberglass epoxy resin sheet 37 obtainable from Precision Laminates Corporation of Danbury, Conn. has been found suitable. For the example given, a thickness of .0015" for the sheet 37 has been found suitable. The wound frames 20 and B stage sheets 37 are alternately stacked depending upon the number of fibers 11 desired in the finished array 17. For example, and using the technique explained above, stacking 42 frames provides a finished array having exterior dimensions ½" x ½" x ⅞" high with approximately 2000 fibers thereby resulting in very high packing density. Two blank Phenolite frames 20 are placed on top after which the top plate 34 of the stacking fixture 33 is placed on the frames 20 and tightened by means of the screws 29 until the fixture 33 is spring loaded by means of precision springs 41 to provide the desired pressure during the curing stage. For example, a total force of 8–10 pounds is satisfactory. The top plate 34 is maintained in alignment by the pins 36 used to hold the frames 20 aligned.

Figure 5:
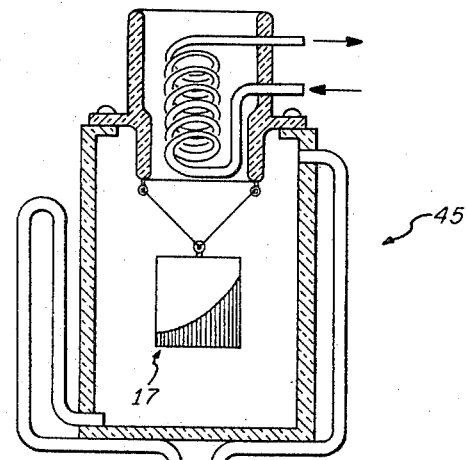
FIG. 5 is a perspective view showing the stacked and bonded frames.

The entire fixture 33 is then placed in an oven at 345–355° F. and cured for about four hours for the final cure and bonding. After curing, the fixture 33 is removed from the oven, disassembled and the bonded array 17 removed from the stacking fixture 33. As shown in FIG. 5, the array 17 is bonded into an integral unit with the fibers 11 extending across the respective apertures 22 to form a free fiber area 42. The apertures 22 of the frames 20 and the corresponding apertures (not shown) of the B stage sheets 37 define a mold 43 having the form of the apertures 22 with the depth defined by the stacked height of the bonded array 17.

With the bonded array 17 still hot and the bottom of the mold 43 blanked off, a potting compound, in liquid form, is poured into the free fiber area 42 within the mold 43 by means of an eyedropper or other suitable means, taking care not to damage the delicate fibers 11. A number of potting mediums are suitable, for example, waxes, resins, shellacs, plastics or mixtures thereof, or low melting point metals. The potting medium should be capable of (a) Properly supporting the free fibers 11 during the subsequent steps of cutting and polishing.

(b) Have a hardness compatible to quartz to permit proper polishing.

(c) In the liquid state, the potting compound should have a relatively low viscosity to flow readily between the interstices of the fibers, and (d) Be easily removed without leaving a residue on the fibers 11.

A particularly suitable potting compound has been found to be an uncatalyzed epoxy resin which is solid at room temperature but liquid at elevated temperatures such as Epon® 1001 with approximately 10% by weight of high melting point wax such as Acrowax C. Epon 1001 is obtainable from the Shell Chemical Division. The wax is used to decrease the brittleness of the resin. The potting compound is brought to a temperature of about 350° and poured into the mold 43 of the array 17. Upon cooling, the potted array 17 is then cut to size by cutting along the dotted lines parallel to the longitudinal axes of the fibers 11, as shown in FIG. 5 on a conventional slicing saw. This removes the excess material and leaves the potted array 17 ready for final cutting polishing. As shown in FIG. 5, the potted array 17 is then rotated 90° and cut perpendicular to the longitudinal axes of the fibers 11 near the extremities of the potted fibers furthest from the contour 19 depending upon the frequency range of the finished array 17 thereby providing a plurality of fibers having varying lengths which are responsive to a plurality of frequencies when the potting compound is removed. The final cut is parallel to the cut which approximately determines the frequency of the finished array 17 and results in a desired overall length while insuring that there is sufficient support material for the fibers having the longest free fiber length. The front and rear surfaces of the array 17 containing the extremities 14 and 15 of the fibers 11 are polished on metallographic disc polishers. Final polishing is accomplished by utilizing diamond paste on a polishing paper to provide for proper light transmission through the fibers 11.

Figure 6:
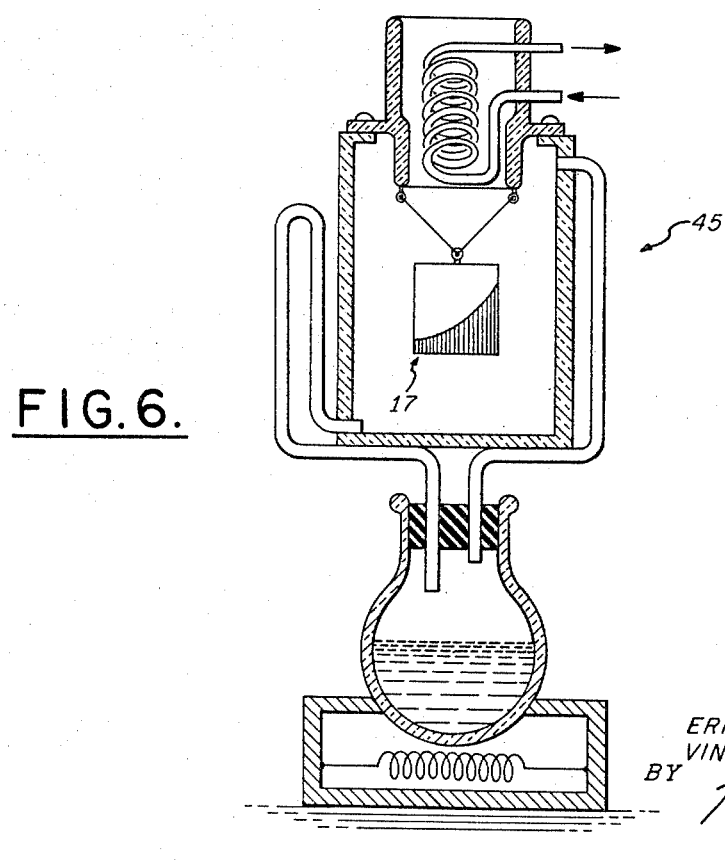
FIG. 6 is a front view showing the step of removing the potting compound by a Soxhlet extraction process.

After the polishing is completed, the polished array 17 is placed with the fibers 11 facing down in a Soxhlet extractor 45 as shown in FIG. 6, to remove the potting compound. The Soxhlet extractor 45 contains a suitable solvent such as xylene in its base. After several extraction cycles substantially all of the potting compound has been removed from between the fibers 11. The Soxhlet extraction process insures non-contaminated chemical clean out. The array 17 is then placed in clean hot xylene bath at approximately 170° F. temperature which in turn is placed in an ultrasonic cleaner vat for approximately 5 minutes, after which the array 17 is dipped in acetone to remove any excess xylene. The array 17 is then washed in hot distilled water containing approximately 20% detergent such as Alconox, then rinsed in hot distilled water in an ultrasonic cleaner and finally rinsed in alcohol in the ultrasonic cleaner. Finally drying is done in a vacuum oven at approximately 220° F. in a vacuum of 30″ of mercury for twenty minutes. This completes the process and provides an array 17 as shown in FIG. 1 having a plurality of cantilevered fibers 11 extending at varying lengths from an accurately contoured interface 16 of a support member 12 to be responsive to a plurality of frequencies over a desired frequency range.

Figure 7:
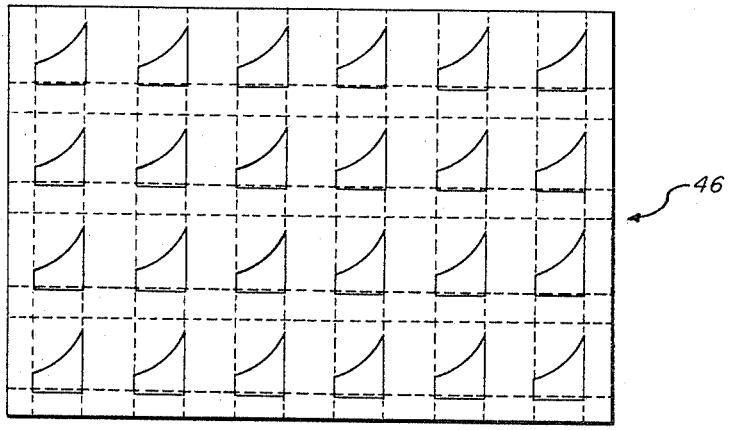
FIG. 7 is a plan view of sheet having a plurality of apertures cut therein.
Figure 8:
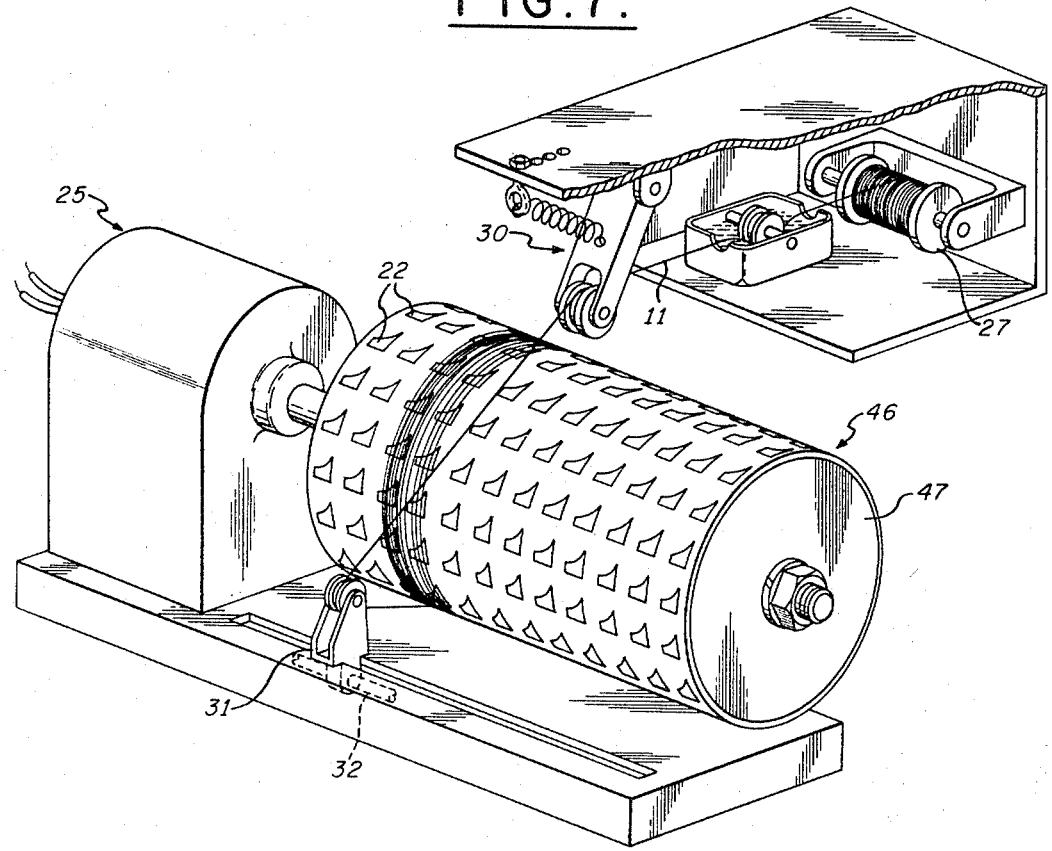
FIG. 8 is a perspective view of a winding machine showing a method of winding the fibers on the sheet of FIG. 7.

It will be appreciated that the invention may be practiced by substituting alternative steps in the aforementioned process. For example, as shown in FIG. 7, the frames 20 instead of being individual units may be in the form of a sheet 46 having a plurality of apertures 22 punched out of the sheet 46. The sheet 46 may be flexible in order that it can be secured, as shown in FIG. 8, to a cylindrical drum 47 and then wound, stacked and bonded as a plurality of sheets 46 in a manner similar to that described above with respect to the individual frames 20. After bonding, the respective free fiber areas 47 are potted as described above. Then, the bonded sheets 46 are cut along the dotted lines shown in FIG. 7 to form individual arrays 17 which would then be cleaned and polished as previously explained.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. The method of producing a frequency responsive device having a desired plurality of flexible, energy-transmitting elements, including the steps of
   (a) forming a mounting member,
   (b) securing a first plurality of said elements to said mounting member in aligned and spaced relation whereby in the finished device at least one end of each of said elements is free to vibrate,
   (c) stacking a plurality of said mounting members to provide said desired plurality of elements in said aligned and spaced relation,
   (d) and forming said stacked mounting members into an integral unit to provide an array of said elements disposed for vibration in response to a plurality of frequencies.

2. The method of producing a frequency responsive device having a desired plurality of flexible, energy-transmitting elements, including the steps of,
   (a) forming a mounting member having an aperture therein defining a predetermined contour,
   (b) securing a first plurality of said elements to said mounting member to extend across said aperture with said elements being parallel and spaced with respect to each other,
   (c) stacking a plurality of said mounting members to provide said desired plurality of elements in said aligned and spaced relation,
   (d) and forming said stacked mounting members into an integral unit to provide an array of said elements disposed for vibration in response to a plurality of frequencies.

3. The method of producing a frequency responsive device having a desired plurality of flexible, energy-transmitting fibers, including the steps of,
   (a) forming a mounting member with an aperture therein having a predetermined contour related to a predetermined frequency range,
   (b) securing a first plurality of said fibers to said mounting member to extend across said aperture with said fibers being parallel and spaced with respect to each other,
   (c) stacking a plurality of said mounting members to provide said desired plurality of fibers in said parallel and spaced relation with said apertures aligned to define a mold,
   (d) fusing said stacked mounting members into an integral unit,
   (e) potting said fibers within said mold for securing said fibers,
   (f) and forming said fused mounting members into an integral unit having an array of said fibers responsive to a plurality of frequencies.

4. The method of producing a frequency responsive device having a desired plurality of flexible, energy-transmitting fibers, including the steps of,
   (a) forming a substantially flat mounting member with an aperture therein having a predetermined contour related to a predetermined frequency range,
   (b) removably securing a plurality of said mounting members to the drum of a winding machine with said apertures aligned with respect to each other, (c) winding said fibers across said apertures in spaced parallel relation, (d) securing a first plurality of said fibers to respective mounting members, (e) forming said wound mounting members into individual substantially planar laminations, (f) stacking a plurality of said laminations to provide said desired plurality of fibers in said parallel and spaced relation with said apertures aligned to define a mold, (g) fusing said stacked mounting members into an integral unit, (h) potting said fibers within said mold for securing said fibers, (i) and forming said fused mounting members into an integral unit having an array of said fibers responsive to a plurality of frequencies.

5. The method of producing a frequency responsive device having a desired plurality of flexible, energy-transmitting fibers responsive throughout a desired frequency range, including the steps of, (a) forming a plurality of substantially flat mounting members each with an aperture therein having a predetermined contour related to a predetermined frequency range, (b) apply an adhesive coating to each of said mounting members in the vicinity of said apertures, (c) removably securing a plurality of said mounting members to the drum of a winding machine with said apertures aligned with respect to each other, (d) winding said fibers across said apertures in spaced parallel relation and on said adhesive coating for securing a first plurality of said fibers to respective mounting members while providing a free fiber area defined by said apertures, (e) forming said wound mounting members into individual substantially flat laminations, (f) stacking a plurality of said laminations to provide said desired plurality of fibers in said parallel and spaced relation with said apertures aligned to define a mold, (g) fusing said stacked mounting members into an integral unit, (h) potting said fibers within said mold for securing said fibers in said free fiber area, (i) cutting said potted integral unit into the desired array size with said fibers having exposed extremites, (j) polishing the exposed extremities of said fibers, (k) and freeing the potted portion of said fibers to provide an array having a plurality of cantilevered fibers of varying lengths responsive to a plurality of frequencies throughout a desired frequency range.

6. The method of making a unitary assembly of fibers arranged in a prescribed geometrical pattern and individually having a preselected frequency response differing from that of others, said method including the steps of (a) arranging a plurality of members each having a first plurality of said fibers in relatively spaced, generally parallel relationship, (b) and forming a base support for holding a second plurality of said fibers as a unitary structure in said relationship and with the fibers extending from said support at unequal free lengths whereby they may vibrate at individual preselected frequencies, (c) said base being formed by bonding a plurality of said members together to form a three-dimensional unitary base structure and simultaneously forming in said bonding operation the surface of the resulting base structure from which said second plurality of fibers protrude of such configuration as to define at least in part the dissimilar and preselected vibratory free lengths of the individual fibers.

7. The method of making a unitary assembly of light-transmitting fibers arranged in a prescribed geometrical pattern and individually having a preselected frequency response differing from that of others, said method including the steps of (a) arranging a plurality of laminar members each having a first plurality of said fibers in relatively spaced, generally parallel relationship, (b) and forming a base support for holding a second plurality of said fibers as a unitary structure in said relationship and with the fibers extending from said support at unequal free lengths whereby they may vibrate at individual preselected frequencies, (c) said base being formed by bonding a plurality of said laminar members together to form a three-dimensional unitary base structure and simultaneously forming in said bonding operation the surface of the resulting base structure from which said second plurality of fibers protrude of such configuration as to define at least in part the dissimilar and preselected vibratory free lengths of the individual fibers.

References Cited

UNITED STATES PATENTS

| | | | |
|---|---|---|---|
| 2,328,302 | 8/1943 | Simison | 65—4 |
| 2,457,981 | 1/1949 | De Forest | 65—4 X |
| 3,004,368 | 10/1961 | Hicks | 65—4 |
| 3,247,755 | 4/1966 | Siegmund | 88—1 |

EARL M. BERGERT, *Primary Examiner.*

J. P. MELOCHE, *Assistant Examiner.*